(12) United States Patent
Dillard

(10) Patent No.: US 6,526,690 B2
(45) Date of Patent: Mar. 4, 2003

(54) MOUNT FOR RIGGING TREBLE AND SINGLE-BARB FISHHOOKS

(76) Inventor: Michael C. Dillard, 2805-1 Dunn Ave., Jacksonville, FL (US) 32218

(*) Notice: Subject to any disclaimer, the term of this patent is extended or adjusted under 35 U.S.C. 154(b) by 0 days.

(21) Appl. No.: 10/004,975

(22) Filed: Dec. 4, 2001

(65) Prior Publication Data

US 2002/0069573 A1 Jun. 13, 2002

Related U.S. Application Data

(60) Provisional application No. 60/255,181, filed on Dec. 13, 2000.

(51) Int. Cl.[7] .................................. A01K 97/00
(52) U.S. Cl. .................................. 43/4; 269/907
(58) Field of Search .................... 43/4, 57.1, 57.2; 269/907

(56) References Cited

U.S. PATENT DOCUMENTS

| | | | |
|---|---|---|---|
| 2,489,547 A | | 11/1949 | Temple |
| 3,578,035 A | * | 5/1971 | Parker ............... 140/102.5 |
| 4,333,614 A | * | 6/1982 | Flax .................. 242/446 |
| 4,403,797 A | * | 9/1983 | Ragland, Jr. .......... 289/17 |
| 4,413,660 A | | 11/1983 | Conrad |
| 4,544,145 A | | 10/1985 | Norlander |
| 5,004,020 A | | 4/1991 | Meinershagen |
| 5,098,193 A | | 3/1992 | Christensesn et al. |
| 5,197,217 A | * | 3/1993 | Browning ............. 43/1 |
| 5,439,236 A | | 8/1995 | Musil |
| 5,685,037 A | * | 11/1997 | Fitzner et al. ......... 289/17 |
| 5,716,020 A | | 2/1998 | Shults |
| 5,809,686 A | | 9/1998 | Abby |
| 5,853,033 A | | 12/1998 | Kavanagh |
| 6,119,972 A | | 9/2000 | Vogel et al. |
| 6,322,112 B1 | * | 11/2001 | Duncan ............... 289/1.2 |

* cited by examiner

Primary Examiner—Charles T. Jordan
Assistant Examiner—Kimberly S. Smith
(74) Attorney, Agent, or Firm—Thomas C. Saitta

(57) ABSTRACT

A mount for rigging a single-barb fishhook or a treble hook which temporarily secures the fishhook for rotation by a motorized drill or similar type of equipment or by hand, where the eye is maintained in a generally fixed spatial location on or near the central axis of the mount during rotation, for attachment of a wire leader to the eye of the fishhook. A bore perpendicular to the rotational axis is provided to retain a single-barb fishhook and a cross member is provided to retain a treble hook. A short segment of the wire lead is threaded through the eye and bent back toward the main body of the wire leader. Both the main body and the short segment of the wire leader are then held in fixed relationship while the mount is rotated.

21 Claims, 3 Drawing Sheets

MOUNT FOR RIGGING TREBLE AND SINGLE-BARB FISHHOOKS

This application claims the benefit of U.S. Provisional Patent Application Ser. No. 60/255,181, filed Dec. 13, 2000.

BACKGROUND OF THE INVENTION

This invention relates generally to the field of mounts, chucks, vises or the like used to temporarily secure a fishhook whereby the fish hook can be rotated by a motor or other means for tying, rigging or line securing operations. More particularly, the invention relates to such mounts which secure the fishhook in such a manner that it is rotated about a central axis such that a wire leader can be secured to the eye of the fishhook, with the end of the leader being twisted to lock it onto the fishhook.

Securing a fishhook to a wire leader is a time consuming task when done by hand without the assistance of motorized equipment. To secure a fishhook, the end of the wire leader is inserted through the eye a short distance to expose a short length of wire. This exposed length of wire is then grasped by hand and wrapped around the main wire at a point adjacent the eye of the fishhook. For optimum security and proper results, the early wire wraps are more axially oriented than the latter wraps, which are more perpendicularly oriented to the central axis. The early wraps are known as haywire twists and the latter wraps are known as barrel twists. Any excess leader wire remaining after the haywire and barrel twists are formed is then snipped off. This is a relatively slow process when done by hand, requiring significant control and concentration to properly maneuver the wire. It is difficult to replicate the twist angles from one fishhook to the next, such that the quality of the connections may vary greatly even when performed by the same individual. Because one or more sharp barbs are present on the hook being rigged, and because the wire leader is thin yet strong, injuries are also common.

It is an object of this invention to provide a mount which temporarily receives and holds a fishhook in a secure manner which allows the fishhook to be rotated on its central axis in order to attach a wire leader to the fishhook, the mount being adapted preferably for insertion into a powered hand drill, for example. It is further object to provide such as mount which is simple and quick to use, requires no mechanical adjustments, tightening or the like, and which can be used with single-barb fishhooks or treble hooks of varying sizes and configurations.

SUMMARY OF THE INVENTION

The invention is in general a fishhook mount for rigging a fishhook on a wire leader, which allows the fishhook to be rotated about a central axis with the eye extending from the mount and disposed along the central axis, such that the wire leader can be secured to the fishhook by inserting the free end of the wire through the eye and then rotating the fishhook while guiding the free end down the main segment of the wire leader away from the mount and the eye of the fishhook. The mount is provided with a shaft preferably adapted for insertion into the chuck of a hand drill or similar powered rotational device, or the shaft may be manually turned in a rotational device, or the shaft may be rotated by the operator's fingers.

The mount is structured to secure both a single-barb fishhook consisting of an eye, a shaft, a curved segment and a barb, as well as a treble hook consisting of an eye, a shaft, three curved segments disposed at 120 degrees, and three barbs. The mount has a hook receiving main body having a neck member, a treble hook shank receiving channel coaxially aligned with the central axis of the mount shaft, and a pair of treble hook curved segment recesses disposed in a cross member extending laterally from the central axis in a generally T-shaped configuration. The main body is connected to the mount shaft by an offset arm member. With the treble hook shank placed into the treble hook receiving channel, two of the treble hook curved portions and barbs extend to either side of the neck member and are detained for axial rotation by the receiving recesses, and the eye is properly positioned on the central axis.

The mount also has a single-barb fishhook shank receiving channel which is angularly disposed on the main body on the opposite side from the treble hook shank receiving channel, with the longitudinal axis of the single-barb fishhook shank receiving channel being in the same plane as the central axis. A single-barb fishhook curved segment receiving bore is disposed perpendicularly to the central axis between the offset arm member and the mount shaft. With the single-barb fishhook curved segment and barb inserted through the receiving bore and the shank placed into the single-barb fishhook shank receiving channel, the receiving bore detains the fishhook for rotation and the eye of the fishhook is positioned on the central axis. In a preferred alternative embodiment, the mount has a second single-barb fishhook curved segment receiving bore disposed in the cross member to receive the barb and curved segments of fishhook with shorter shanks.

DETAILED DESCRIPTION OF THE INVENTION

With reference to the drawings, the invention will now be described in detail with regard for the best mode and the preferred embodiment. In general, the invention is a fishhook mount preferably adapted to be inserted into or retained by means to rotate the mount, such as a motorized hand drill or similar type of equipment, the mount holding the fishhook in a temporary yet secure manner to enable attachment of a wire leader to the fishhook by rotating the fishhook after the end of the wire leader has been inserted through the eye of the fishhook. The mount is adapted for use with single-barb fishhooks and with treble hooks, having means to temporarily hold and retain a single-barb fishhook and separate means to temporarily hold and maintain a treble hook fishhook, such that the eye for receiving the wire leader is disposed on or near the central rotational axis of the mount.

Figure 6:
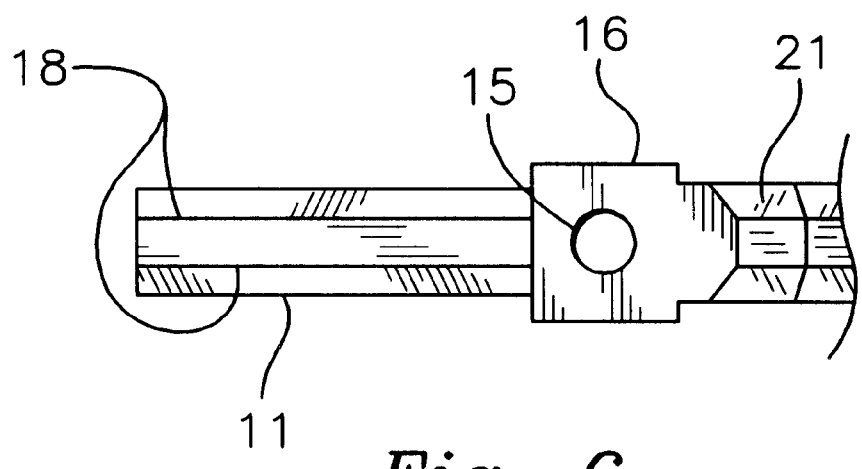
FIG. 6 is a partial top view of an alternative embodiment of the invention, showing gripping means disposed on the shaft.

The mount 10 comprises a longitudinally extending mount shaft 11, which may be circular or polygonal in cross-section and which is preferably sized so as to be received in the chuck of a motorized hand drill or like apparatus capable of rotating the mount 10 about the central axis 99 of the mount shaft 11. Where the wire leader 100 is thin, the shaft 11 may also be rotated between the fingers of the person performing the rigging operation. For this manual rotation, additional gripping means 18 may be provided on the shaft 11, such as by providing grooves or ridges, a polygonal cross-section, as shown in FIG. 6, flanges, a handle or the like. Most preferably, the gripping means do not interfere with insertion of the shaft 11 into a power drill. The mount 10 further comprises a main hook receiving body 22, where the main body 22 is offset a distance from the central axis 99, being joined to the mount shaft 11 by an offset arm member 21 which angles away from the central axis 99 toward the distal end 23 of the mount 10. The main body 22 is configured generally in a T-shape, having a neck member 26 joined to the offset arm member 21 and connecting to a cross member 25 which extends laterally from the central axis 99. The neck member 26 in particular is disposed away from the central axis 99, such that preferably the plane containing the upper surface 24 of the cross member 25 also contains the central axis 99. A coaxially extending treble hook shank receiving channel 12 is provided in the cross member upper surface 24, the treble hook shank receiving channel 12 being preferably semi-circular in transverse cross-section and extending from the distal end 23 of the main body 22 completely through the cross member 25 in the axial direction. The central axis 99 is also most preferably the central axis of the treble hook shank receiving channel 12.

A pair of treble hook curved segment receiving recesses 13 are provided in the cross member 25, one on each side of the neck member 26, with the receiving recesses 13 opening on the side opposite from the upper surface 24. The receiving recesses 13 extend completely through the cross member 25 in the axial direction, and are symmetrically disposed to either side of the neck segment 26. The combination of the treble hook shank receiving channel 12 and the pair of treble hook curved segment receiving recesses 13 comprise the means to hold and retain a treble hook fishhook during the rigging operation.

Figure 4:
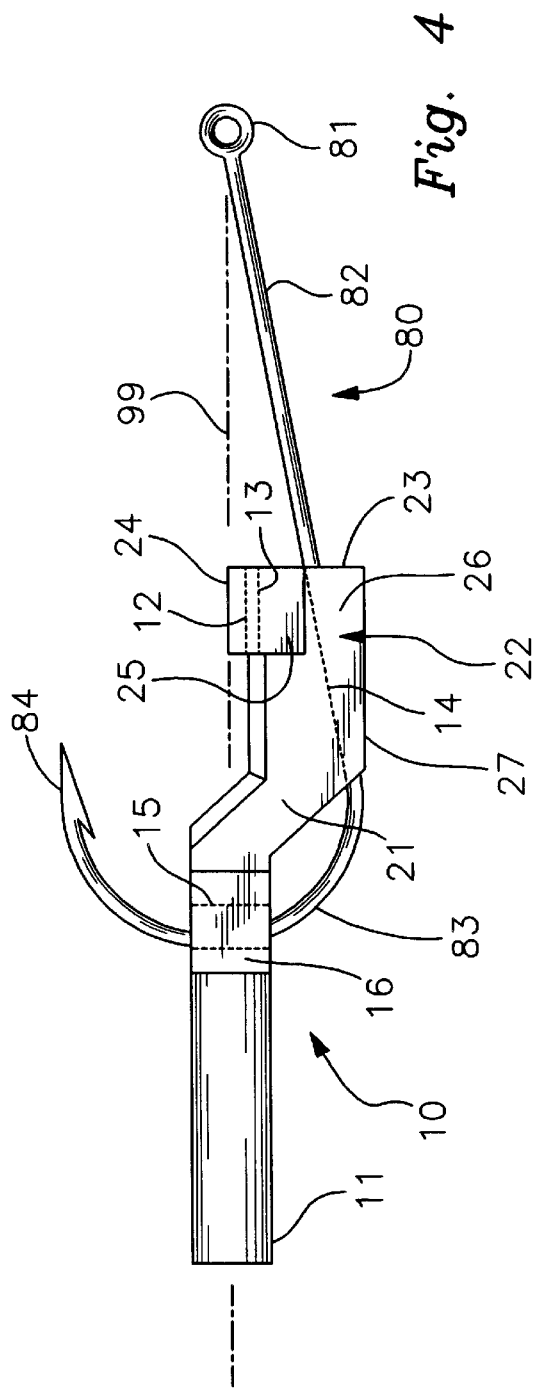
FIG. 4 is a side view of the invention, showing a single large fishhook being detained.

Preferably, a single-barb fishhook shank receiving channel 14 is provided in the lower surface 27 of the main body 22. The single-barb fishhook shank receiving channel 14 extends in the axial direction but is disposed non-parallel and angled toward the central axis 99, such that the single-barb fishhook shank receiving channel 14 is closest to the central axis 99 at the distal end 23, as shown in FIG. 4. With this design, the longitudinal axis of the single-barb fishhook shank receiving channel 14 will intersect the central axis 99 at a point in space beyond the distal end 23.

A single-barb fishhook curved segment receiving bore 15 is positioned between the mount shaft 11 and the offset arm member 21, the bore 15 disposed transversely and preferably perpendicularly to the central axis 99 and aligned such that the central axis of bore 15 is also contained within the plane containing both the longitudinal axis of the single-barb fishhook shank receiving channel 14 and the central axis 99. Bore 15 may be disposed within a bore body 16 which provides an abutment for insertion of the mount shaft 11 into a drill chuck. The combination of the single-barb fishhook curved segment receiving bore 15 and the single-barb fishhook shank receiving channel 14 comprise the means for holding and retaining a single-barb fishhook.

A single-barb fishhook 80 comprising an eye 81, linear shank 82, curved segment 83 and barb 84 is retained by the mount 10 as shown in FIG. 4. The barb 84 is inserted into and through the bore 15 such that the curved segment 83 rests within bore 15. The shank 82 is placed into the single-barb fishhook shank receiving channel 14. Because of the inclined disposition of the single-barb fishhook shank receiving channel 14, the eye 81 will be positioned approximately along or adjacent the central axis 99. As the mount 10 is rotated about the central axis 99, the fishhook 80 is also rotated, with the eye 81 remaining in a substantially fixed location in space. A wire leader 100 inserted through the eye 81 will be easily twisted if the free end of the wire 100 is restrained from rotation. The mount 10 will accommodate fishhooks 80 of various sizes.

Figure 1:
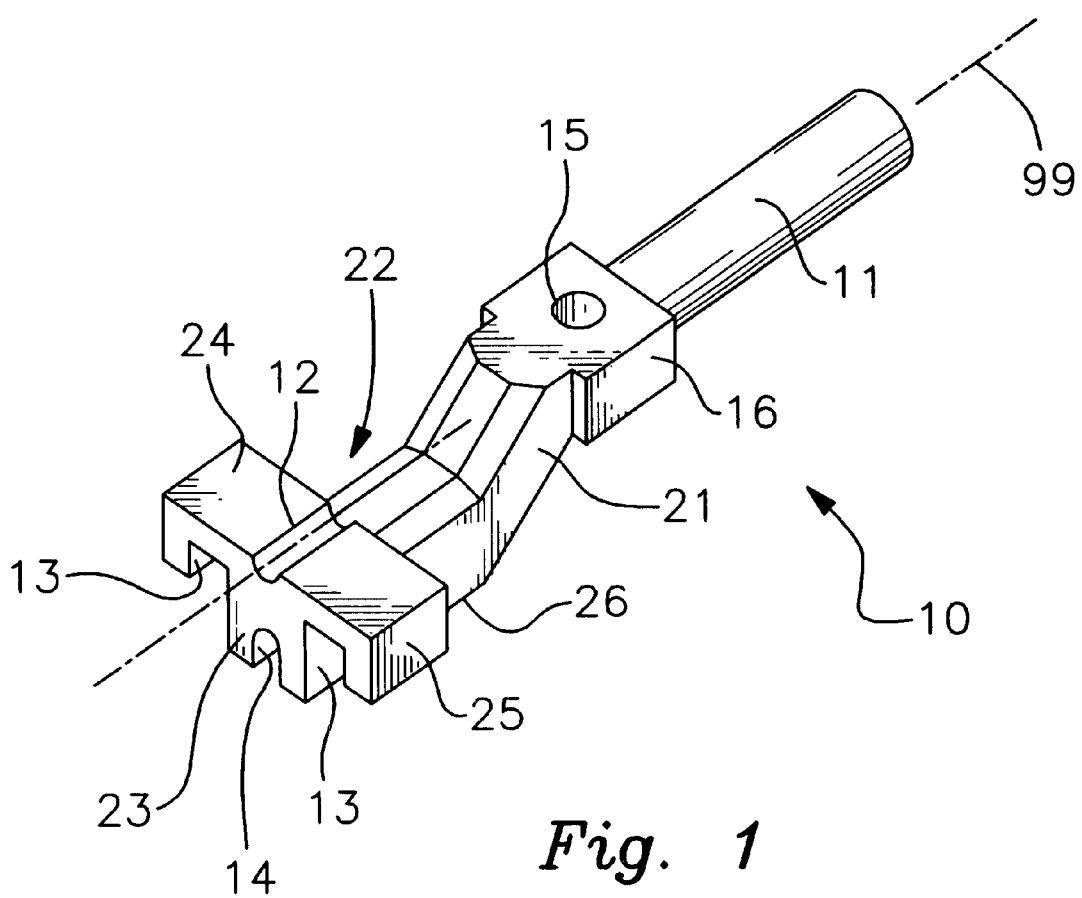
FIG. 1 is a perspective view of the invention.
Figure 2:
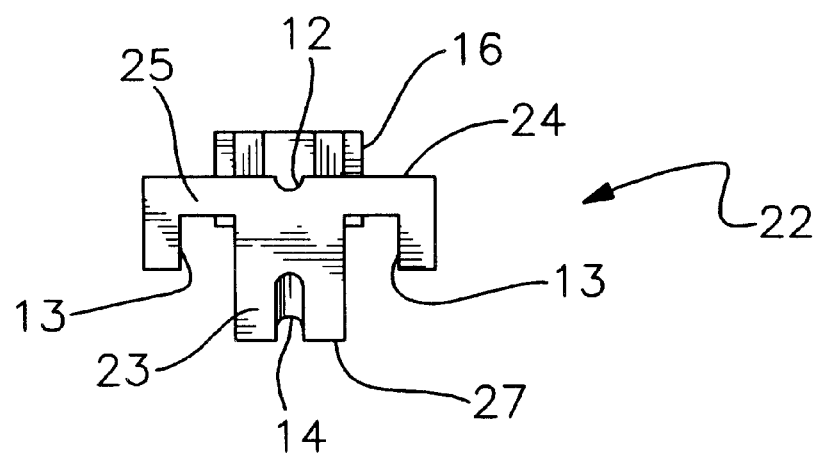
FIG. 2 is a view of the invention from the distal end.
Figure 3:
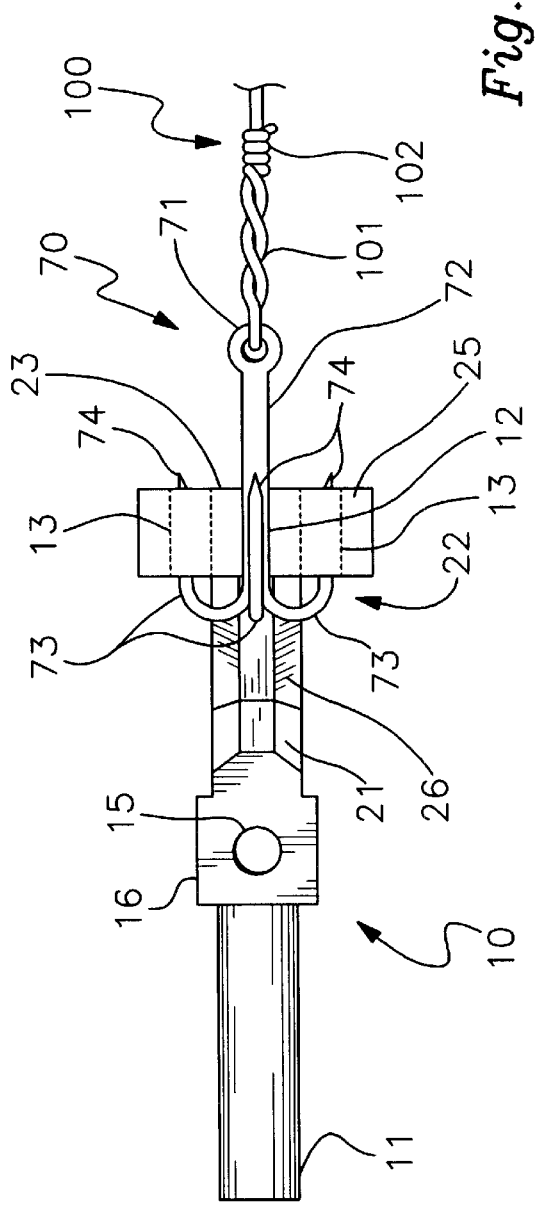
FIG. 3 is a top view of the invention, showing a treble hook being detained and the lead wire attached and twisted.

A treble hook 70 comprising an eye 71, linear shank 72, three curved segments 73 disposed at 120 degrees, and three barbs 74 is retained by the mount 10 as shown in FIG. 3. The treble hook 70 is positioned such that a set of adjacent curved segments 73 flank the neck member 26 of the main body 22 with the shank 72 resting in the treble hook shank receiving channel 12, the eye 71 being disposed beyond the distal end 23. The two adjacent curved segments 73 are pulled in the axial direction toward the distal end 23, such that the adjacent curved segments 73 and/or barbs 74 are positioned within the pair of treble hook curved segment receiving recesses 13. The pair of treble hook curved segment receiving recesses 13 secure the treble hook 70 such that rotation of the mount 10 also rotates the treble hook 70. The shank 72 disposed within the treble hook shank receiving channel 12 is coaxial with the central axis 99 and thus the eye 71 is positioned on the cental axis 99. In this manner the eye 71 will be rotated about the central axis 99 in a generally fixed spatial location. As before, a wire leader 100 inserted through the eye 71 will be easily secured to the treble hook 70 by restraining the free end of the wire 100 from rotation while the mount and treble hook 70 are rotated.

Figure 5:
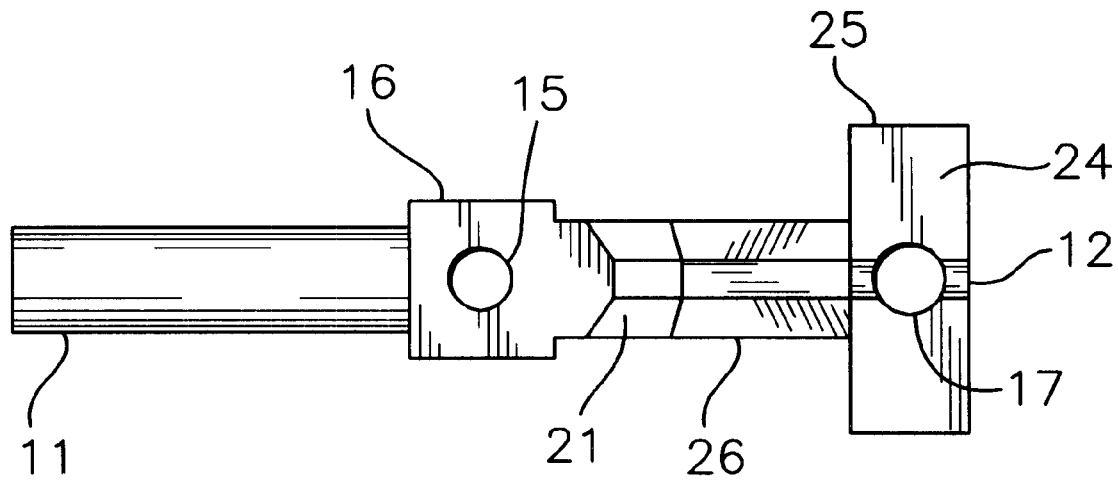
FIG. 5 is a partial top view of an alternative embodiment of the invention, showing a second single-barb fishhook receiving bore.

To accommodate single-barb fishhooks having relatively short shank lengths, a preferred embodiment of the mount 10 is shown in FIG. 5 having a second means to retain a single-barb fishhook. In this embodiment, a second single-barb fishhook curved segment receiving bore 17 is disposed perpendicularly to the central axis 99 in the cross member 25 of the hook receiving body 22, such that it passes through the treble hook shank receiving channel 12. With this construction, single-barb fishhooks having shanks too short to allow for insertion of the barb into the primary fishhook receiving bore 15 can still be rigged using the mount 10. The barb and curved segment of these shorter fishhooks is passed through the second receiving bore 17 such that the eye is disposed distally from the mount 10. The second receiving bore 17 can also be used to receive the barbs of artificial lures, jig heads, plugs, etc., which have large bodies or unusual shapes.

The fishhook rigging operation is very straightforward. Most preferably, the powered drill or other motor means is mounted in a fixed manner with the mount 10 facing downward. A short segment of the wire leader 100 is passed through the eye 71 or 81 of the fishhook 70 or 80, and the fishhook 70 or 80 is properly positioned within the mount 10 as described above. The short segment of the wire leader 100 is bent in reverse manner and pulled to cross the main body of the leader wire 100 such that a small wire loop is formed at the eye 71 or 81. The mount 10 is then slowly rotated for several turns while both the short segment and the main body of the leader wire 100 are held by the operator, which rotates the fishhook 70 or 80 and twists the wire leader 100 to form the desired number of haywire twists 101, typically five or six. The rotation is then stopped and the remaining free end of the short segment of the leader 100 is bent outward so as to be perpendicular to the main body of the leader 100. The operator aligns the wire leader main body along the central axis 99 mount 10 and firmly grips the junction point between the thumb and finger. The mount 10 is then slowly rotated for several turns, thus forming the barrel twists 102 which are relatively perpendicular to the main body of the wire leader 100. The remaining length of the short segment is then snipped and the rigging is complete.

The mount 10 can also be used to rig stinger and multiple stinger rigs, or to attach lead wire 100 to swivels. Swivels are temporarily affixed to the mount 10 by using a fishhook 70 or 80 as an accessory. The fishhook eye 71 or 81 is cut to form a hooked configuration and the fishhook 70 or 80 is positioned in the mount 10 as previously described. One eye of the swivel is then placed onto the hook and the wire lead 100 is threaded through that eye. Winding the wire lead 100 is then accomplished as described above by rotating the mount 10.

The size and particular configuration of the mount 10 may vary within the parameters of the structure defined above, but for reference it has been found that preferable dimensions include a shaft 11 of about 1.25 inches in length and about 0.25 inches in diameter, an overall axial length of about 3.0 inches, a cross member 25 width of about 1.0 inch, axial length of about 0.375 inches and depth of about 0.25 inches, a treble hook fishhook shank receiving channel 12 radius of about 0.0625 inches, treble hook fishhook curved segment receiving recesses 13 width of about 0.1875 inches each and a separation distance from the cross member upper surface 24 of about 0. 125 inches, a single-barb fishhook shank receiving channel 14 width of about 0.125 inches, axial length of about 0.9375 inches, angled such that its longitudinal axis crosses the central axis 99 about 1.5 inches from the distal end 23, a neck member 26 width of about 0.375 inches and depth of about 0.4375 inches, a single-barb fishhook curved segment receiving bore 15 diameter of about 0.1875 inches and a second single-barb fishhook curved segment receiving bore 17 diameter of similar or lesser dimensions.

It is understood that certain equivalents and substitutions for elements set forth above may be obvious to those skilled in the art, and thus the true scope and definition of the invention is to be as set forth in the following claims.

I claim:

1. A mount for temporarily holding a fishhook of either single-barb or treble hook structure, wherein said mount and fishhook are adapted to be rotated to attach a wire leader to said fishhook, said fishhook comprising an eye to receive said wire leader, a generally linear shank, either a single curved portion or three curved portions, and either a single barb or three barbs, said mount comprising:
    a shaft adapted to connect said mount to a powered rotating device;
    a generally T-shaped hook receiving body connected to said shaft and comprising an offset arm member, a neck member and a cross member;
    said cross member having a treble hook shank receiving channel and a pair of treble hook curved segment receiving recesses for retaining a treble hook fishhook; and
    a single-barb curved segment receiving bore for retaining a single-barb fishhook.

2. The mount of claim 1, wherein said hook receiving body further comprises a single-barb fishhook shank receiving channel for retaining a single-barb fishhook.

3. The mount of claim 1, wherein said hook receiving body further comprises a second single-barb curved segment receiving bore disposed through said cross member.

4. The mount of claim 2, wherein said hook receiving body further comprises a second single-barb curved segment receiving bore disposed through said cross member.

5. The mount of claim 1, wherein said shaft includes a central axis and wherein said treble hook shank receiving channel includes a longitudinal axis parallel to said central axis.

6. The mount of claim 5, wherein said treble hook shank receiving channel is semi-circular in transverse cross-section.

7. The mount of claim 5, wherein said longitudinal axis of said treble hook shank receiving channel is coaxial with said central axis.

8. The mount of claim 2, wherein said shaft includes a central axis and wherein said single-barb fishhook shank receiving channel includes a longitudinal axis co-planar to said central axis.

9. The mount of claim 8, wherein said longitudinal axis of said single-barb fishhook shank receiving channel is non-parallel to said central axis.

10. The mount of claim 1, wherein said shaft includes a central axis, and wherein said single-barb curved segment receiving bore is perpendicular to said central axis.

11. The mount of claim 3, wherein said shaft includes a central axis, and wherein said second single-barb curved segment receiving bore is perpendicular to said central axis.

12. The mount of claim 1, wherein said cross member includes an upper surface, and wherein said treble hook shank receiving channel is disposed on said upper surface and said pair of treble hook curved segment receiving recesses are disposed symmetrically about said neck member.

13. The mount of claim 12, wherein said shaft includes a central axis, and wherein said upper surface is co-planar with said central axis.

14. A mount for rigging a fishhook to a wire leader, wherein said fishhook is either a single-barb fishhook or a treble hook fishhook, wherein said mount is adapted to be connected to a powered hand drill or similar device capable of imparting rotary motion to said mount, said mount comprising:
    a shaft having a central axis;
    a hook receiving body connected to said shaft, said hook receiving body comprising an offset arm member, a neck member, a cross member, and a single-barb curved segment receiving bore;
    said single-barb curved segment receiving bore and said cross member disposed transversely to said central axis, and wherein said single-barb curved segment receiving bore is disposed on the opposite side of said neck member from said cross member;
    said cross member comprising an upper surface and a treble hook shank receiving channel disposed on said upper surface, said treble hook shank receiving channel having a longitudinal axis coaxial with said central axis, and further comprising a pair of treble hook curved segment receiving recesses disposed symmetrically about said neck member;
    whereby a single-barb fishhook comprising an eye, a shank, a curved segment and a barb is retained in said mount by inserting said barb and said curved segment into said single-barb curved segment receiving bore such that said eye is disposed on or near said central axis, and whereby a treble hook fishhook comprising an eye, a shank, three curved segments and three barbs is retained in said mount by placing said treble hook shank in said treble hook shank receiving channel and positioning two of said three treble hook barbs in said pair of treble hook curved segment receiving recesses such that said treble hook eye is disposed on or near said central axis, such that rotation of said mount causes equal rotation of said single-barb fishhook or said treble hook fishhook.

15. The mount of claim 14, wherein said hook receiving body further comprises a single-barb fishhook shank receiving channel having a longitudinal axis co-planar with and non-parallel to said central axis.

16. The mount of claim 14, wherein said hook receiving body further comprises a second single-barb curved segment receiving bore, said second single-barb curved segment receiving bore being disposed transversely to said central axis, whereby a single-barb fishhook comprising an eye, a shank, a curved segment and a barb is alternatively retained in said mount by inserting said barb and said curved segment into said second single-barb curved segment receiving bore such that said eye is disposed on or near said central axis.

17. A fishhook rigging mount for connecting a fishhook to a wire leader, said mount comprising:

a shaft having a central axis, whereby said mount is rotatable about said central axis;

a hook receiving body comprising means to retain a treble hook fishhook having an eye, a shank, three curved segments and three barbs, said treble hook fishhook retaining means comprising a treble hook shank receiving channel adapted to receive the shank of said treble hook fishhook and a pair of treble hook curved segment receiving recesses adapted to receive two of the three curved segments of said treble hook fishhook;

said hook receiving body further comprising separate means to retain a single-barb fishhook having an eye, a shank, a curved segment and a barb, said single-barb fishhook retaining means comprising a single-barb curved segment receiving bore adapted to receive the curved segment of said single-barb fishhook;

whereby said treble hook fishhook eye or said single-barb fishhook eye is disposed on or adjacent said central axis during rotation of said mount.

18. The mount of claim 17, wherein said single-barb fishhook retaining means further comprises a single-barb fishhook shank receiving channel adapted to receive the shaft of said single-barb fishhook.

19. The mount of claim 18, said hook receiving body further comprising a second single-barb curved segment receiving bore adapted to receive the curved segment of said single-barb fishhook.

20. The mount of claim 17, said hook receiving body further comprising a second single-barb curved segment receiving bore adapted to receive the curved segment of said single-barb fishhook.

21. The mount of claim 17, said shaft further comprising gripping means for manual rotation of said mount.

* * * * *